W. V. ORR.

SUCTION CLEANER.

APPLICATION FILED MAR. 14, 1921.

Reissued July 25, 1922. 15,423.

2 SHEETS—SHEET 1.

Inventor

By William V. Orr

Harold Elmo Smith

Atty.

W. V. ORR.
SUCTION CLEANER.
APPLICATION FILED MAR. 14, 1921.
Reissued July 25, 1922.
15,423.
2 SHEETS—SHEET 2.
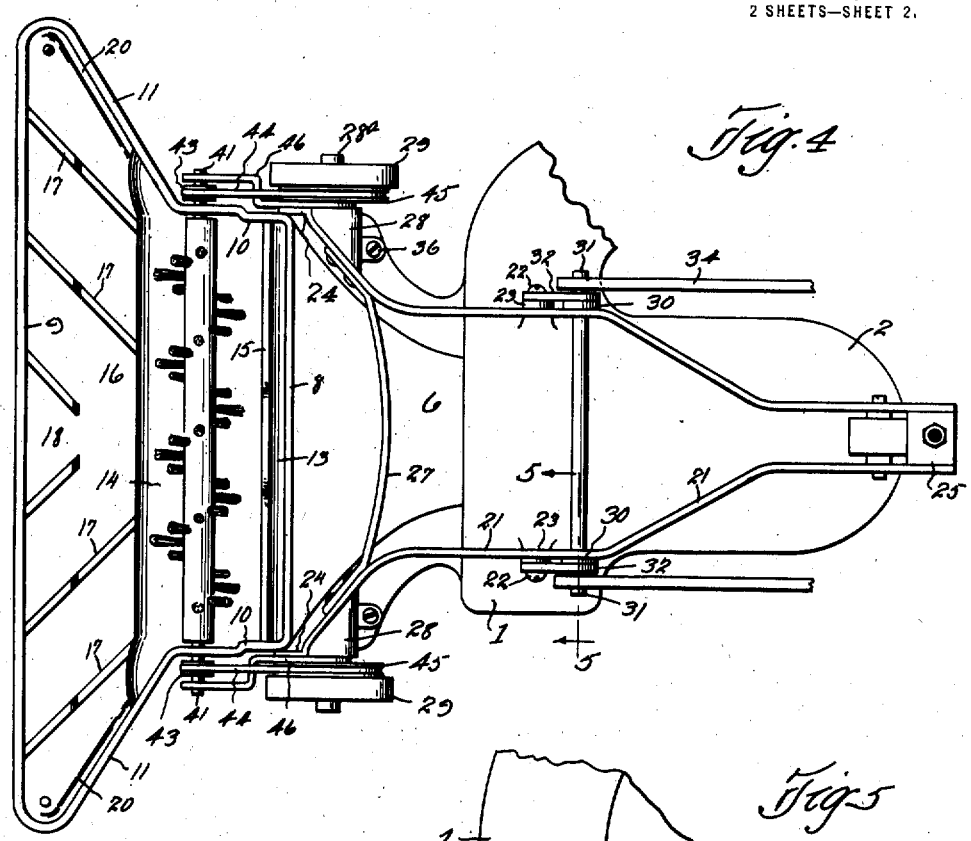
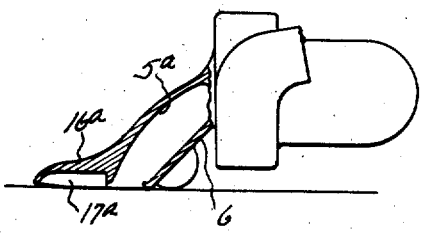
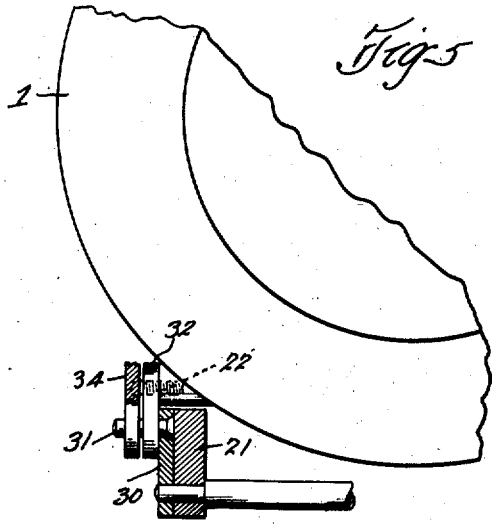
Inventor
William V. Orr
By Harold Elmo Smith
Atty.

UNITED STATES PATENT OFFICE.

WILLIAM V. ORR, OF CLEVELAND, OHIO.

SUCTION CLEANER.

15,423. Specification of Reissued Letters Patent. Reissued July 25, 1922.

Original No. 1,346,972, dated July 20, 1920, Serial No. 142,837, filed January 17, 1917. Application for reissue filed March 14, 1921. Serial No. 452,298.

*To all whom it may concern:*

Be it known that I, WILLIAM V. ORR, a citizen of the United States, residing at Cleveland, in the county of Cuyahoga and State of Ohio, have invented a certain new and useful Improvement in Suction Cleaners, of which the following is a full, clear, and exact description, reference being had to the accompanying drawings.

This invention relates to suction cleaners or vacuum cleaning devices of the type wherein a casing having therein a motor and a suction device is moved about over the floor so as to present its inlet mouth to every part thereof. The objects of the invention are, the provision of a device of this character having new and improved means for agitating the floor covering and removing lint and litter therefrom; the provision of new and improved means for operating such agitating mechanism; the provision of new and improved means for supporting the casing; the provision of new and improved means for regulating the height of the inlet mouth above the floor covering; while other objects and advantages of my invention will become apparent as the description proceeds.

Figure 1:
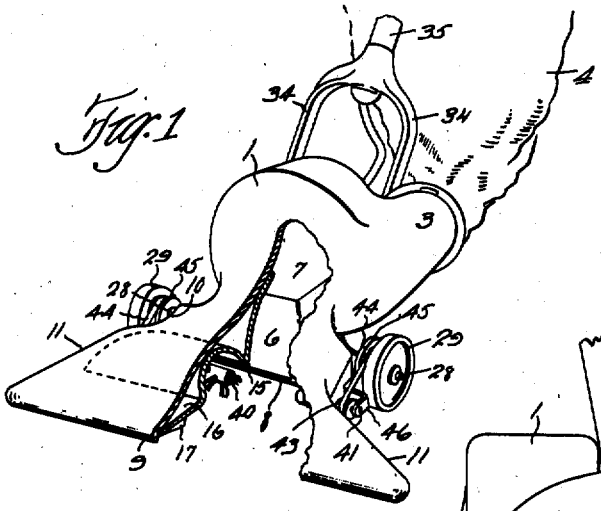
Figure 2:
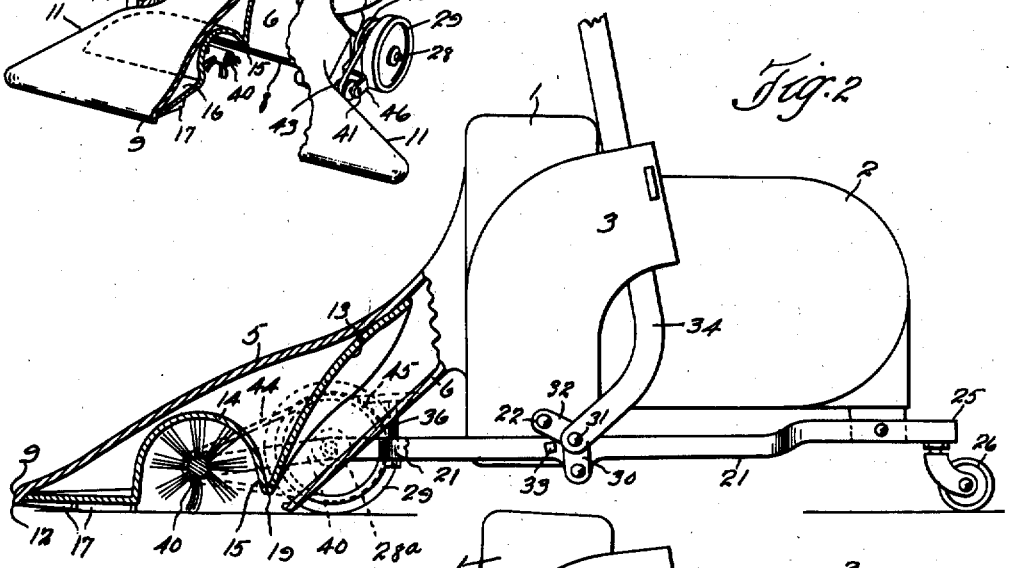
Figure 3:
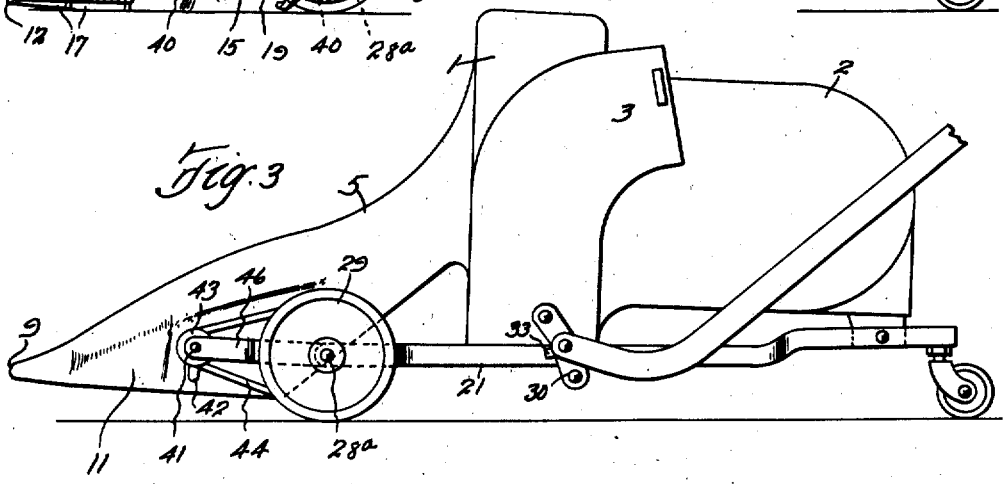

In the drawings accompanying and forming a part of this application, wherein I have illustrated one embodiment of my invention, Fig. 1 is a perspective view of the complete device, a portion of the nozzle being broken away so as to show the interior construction; Fig. 2 is a longitudinal sectional view taken at one side of the fan chamber and showing the nozzle in its most depressed position; Fig. 3 is a side elevational view taken from the same direction as Fig. 2 and showing the nozzle in its most elevated position; Fig. 4 is a bottom plan view of the complete device; Fig. 5 is a detail sectional view on the line 5—5 of Fig. 4, looking in the direction of the arrows; and Fig. 6 is a central sectional view through a modified form of device.

Describing the parts by reference characters, 1 represents the fan chamber portion of the suction cleaner casing, having projecting from one side the motor casing 2, and from the other side a collecting nozzle. The periphery of the fan casing is also provided with an outlet neck 3 to the end of which is attached the dust-bag 4. In the present embodiment the fan casing and motor are intended to be supported with their axis substantially horizontal, although it will be understood that the improvements hereafter to be described can equally well be applied to cleaners of other construction.

The collecting nozzle has an upper wall 5 and a lower wall 6 both of which project forwardly and downwardly from the forward side of the fan chamber, the opening 7 into the fan chamber being included between them. The wall 6 terminates in a straight horizontal lip 8 substantially perpendicular to the cleaner axis, and the wall 5 terminates at its forward end in a depending lip 9 spaced considerably forward from the lip 8 and preferably substantially parallel thereto. These two lips have defined between them an inlet mouth, the plane of whose edges it will be seen is substantially parallel to the axis of the chamber 1.

The ends of the mouth are defined by walls which first run forwardly from the lip 8 substantially parallel to each other as shown at 10—10 and thence flare outwardly as shown at 11—11 until they meet the lip 9. The walls 11—11 are substantially flush with the lip 8, but the lip 9 is terminated slightly thereabove so as to form a small crevice at 12 when the device is applied to a floor.

In the construction shown in Figs. 1 to 4, inclusive, the collecting nozzle is hollow and inside the same is supported a kind of skeleton filler having a throat-portion 13 which projects up into the narrowest part of the nozzle adjacent to the inlet opening; a semi-cylindrical portion 14 extending transversely of the cleaner and forming a brush chamber; a transverse wall or curtain 15 between the throat portion and brush chamber, this wall depending to a point adjacent the floor so as to concentrate the air stream; and upon the forward side of said semi-cylindrical portion a substantially horizontal bridge 16 which extends to the lip 9. Projecting from the lower face of this bridge are the teeth 17—17 which are preferably of narrow elongated shape and of such an inclination to the cleaner axis that a fore-and-aft line touching the end of any tooth will intersect the opposite end of the tooth adjacent thereto. The inclination of these teeth is such as to cause them to lie substantially parallel to the corresponding end wall 11, the teeth thus being oppositely inclined upon the two sides of the central line. Throughout the major portion of their length these teeth are terminated flush with the plane of the lower edge of the walls 11—11, but at their forward ends they are preferably rounded away so as to merge with the lip 9. At the middle of the inlet mouth, the teeth are preferably omitted for a short distance as shown at 18 so that rags and like bulky litter can be taken up without obstruction. For the same reason the curtain 15 is preferably notched slightly at this point as shown at 19.

Adjacent each of the end walls the bridge 15 is preferably displaced somewhat to form a channel 20 of greater height for a purpose which will be explained hereafter.

In the modified construction illustrated in Fig. 6 the lower wall 6 of the nozzle appears as before, but the upper wall 5[a], instead of being made hollow and having a sheet metal filler supported therebeneath, is depressed so as itself to define an inlet throat and to form the roof 16[a] of the inlet mouth, while the teeth 17[a] may either be cast integrally therewith, or be inserted in the mold so as to have the metal of the casing flow therearound, or may be made of separate pieces welded or inset therein. In fact these teeth may be made of other things than metal, a clinging flexible substance like rubber being particularly advantageous. Whatever be the construction, the effect produced upon running the casing backwards and forwards over the floor will be that these teeth exert a kind of scraping motion as well as swaying the fibres of the carpet nap from side to side, which tends in a peculiarly efficient manner to dislodge dirt and litter therefrom, particularly under the influence of the horizontal air stream which enters at the crevice 12 and sweeps between adjacent teeth. Also the combined forward and lateral movement of the teeth tends to roll such things as thread, lint, and dressmakers' scraps into little balls which are very easily moved by the air stream. All of this litter is blown violently against the inclined wall 6 up which it is swept by the air stream, the lifting effect being greatly enhanced by the narrowing of the passage due to the wall or curtain 15. The purpose of the channels 20—20 is two-fold, being first, to equalize the air pressure throughout the nozzle, and second, by providing a concentrated air flow along the walls 11—11 to compensate for a leakage of air into the inlet mouth beneath those walls.

Owing to the very large area of this inlet mouth, the total adhesion of the same to the floor covering is very great, notwithstanding that the teeth 17—17 and the slot or crevice 12 prevent the occurrence on any sealing contact. In case a powerful fan be employed or a clinging fabric be under treatment, the cleaner sometimes clings to one spot so as to be movable only with great difficulty. This difficulty can be overcome by suitably adjusting the vertical height of the nozzle but such adjustment is inconvenient and it is very seldom that a user is found who understands what adjustment should be made and when and why. In addition, experience shows that the nozzle can profitably be depressed more upon the back stroke than upon the forward stroke, which a fixed adjustment does not permit.

My invention comprehends the provision of a chassis or wheeled carriage for the support of the cleaner casing with which may be combined a means for automatically fixing the elevation of the cleaner upon the forward stroke and allowing the same to be depressed upon the rearward stroke, one embodiment of my idea being as follows:

This frame or chassis, in the form here shown, comprises a pair of side members 21, 21, connected by a member 25 at the rear and a transverse cross-piece 27 at the front. Three carrying wheels are shown, one a caster 26 at the rear, pivoted to the member 25, and two wheels 29, 29 pivoted on the gudgeons 28[a], of brackets 28, carried by the side members 21 near their forward ends. This chassis is connected to the casing by having its side members 21, pivoted at 22 upon a transverse horizontal pin or stud seamed to a bracket 23 carried by the cleaner casing. In this embodiment the connection in question includes a toggle joint arrangement, the pin or stud having pivoted thereon a link 32 whose opposite end is articulated by the stud 31, to a link 30 which is pivoted to the member 21. The arms 34 of the handle fork are here shown as applied to the studs 31, the arrangement being such that a forward push on the handle tends to straighten the toggle as shown in Fig. 3, until arrested by the stop 33. Thus if the forward movement of the cleaner be arrested in any manner, the thrust of the handle will tend to straighten the toggle and elevate the nozzle so as to ride over the obstacle or reduce the suction effect. The downward movement of the inlet mouth can be arrested either by its contact with the floor or by an adjustable stop, carried by one part and engaging the other, here typified by the screw 36. It will be understood that I do not limit myself to a toggle connection between the chassis and casing, and that the adjustable stop here shown is not limited to such a combination.

In Figs. 1, 2, 3 and 4, I have shown a cylindrical brush comprising a body 40 located in a chamber 14 and having shaft extensions 41 projecting outwardly through vertical slots 42 formed in the end walls 11. To one or each of these extensions is secured a belt pulley 43 connected by means of a belt 44 to a grooved extension 45 carried by the adjacent wheel 29. A fixed distance between the brush and wheel is maintained by a radius rod 46 swiveled upon each of the gudgeons 28ª inside of the corresponding wheel and having at its free end an aperture receiving the shaft 41. This arrangement permits the brush to adjust itself in height independently of the frame or chassis.

While I have described my invention in detail I do not confine myself to those details except as the same are recited in the claims hereto annexed, or rendered necessary by the prior state of the art, since I am aware many changes in the construction and arrangement can be made without departing from the scope of my inventive idea or sacrificing the advantages of my improvements.

Having thus described my invention what I claim is:

1. In a suction cleaner, a frame having at least three floor-supported carrying wheels, a casing pivoted to said frame and having a collecting nozzle formed with a downwardly facing inlet mouth, an adjustable supporting connection between said frame and said casing additional to the pivot, and an operating handle for said cleaner.

2. In a suction cleaner, a frame having floor-engaging carrying wheels, a casing supported by said frame and having a collecting nozzle formed with a downwardly facing inlet mouth, and an operating handle, said handle being connected to said casing and frame by movable means which upon forward movement of said handle relatively to said casing and frame will raise said casing.

3. In a suction cleaner, a frame having floor-engaging carrying wheels, a casing supported by said frame and having a collecting nozzle formed with a downwardly facing inlet mouth, a toggle joint having its end connected to said frame and casing respectively, and an operating handle pivoted to said toggle joint.

4. In a suction cleaner, a frame having floor-engaging carrying wheels, a casing located above said frame and having a collecting nozzle formed with a downwardly facing inlet mouth, said casing being movable vertically relatively to said frame, adjustable means carried by said frame and serving to limit the downward movement of said casing relatively thereto, links pivoted to said casing and to said frame and arranged to limit the upward movement of said casing, an operating handle, and connections between said handle and links whereby a forward movement of said handle will tend to raise said casing.

5. In a suction cleaner, a frame having a pair of floor-engaging rollers at its forward end, located one on each side thereof, and a single central roller at the rear thereof, a casing having a collecting nozzle projecting beyond the forward end of said frame, having a downwardly facing inlet mouth, said casing being pivoted to said frame upon a horizontal axis at a point removed from said inlet mouth, and means for moving said nozzle relatively to said frame to vary the height of said inlet mouth above the floor.

6. In a suction cleaner, a frame having floor-engaging rollers, a casing pivoted to the rear part of said frame and having a collecting nozzle projecting beyond the forward end of said frame, said nozzle having a downwardly facing inlet mouth, a pair of toggle joints pivoted to said casing and to said frame, one at each side thereof, said toggle joints being adapted to buckle rearwardly, and a handle having a forked end, one arm of which is articulated to each of the tines of the toggle joints.

7. In a suction cleaner, a frame having floor-engaging rollers, a casing pivoted to the rear part of said frame and having a collecting nozzle projecting beyond the forward end of said frame, said nozzle having a downwardly facing inlet mouth, a pair of toggle joints pivoted to said casing and to said frame, one at each side thereof, said toggle joints being adapted to buckle rearwardly, and a handle having a forked end, arm of which is articulated to each of the tines of the toggle joints, and a set screw carried by the forward part of said frame and adapted to engage said casing when said toggle joints are broken.

8. In a suction cleaner, a casing having a downwardly facing inlet mouth, carrying wheels supporting said casing, an operating handle for moving said casing about the surface whereon it is supported by said wheels and connections between said wheels and handle operative upon increase in opposition to the forward movement of said casing by means of said handle to elevate said suction mouth further above the surface on which said carrying wheels rest.

9. In a suction cleaner a frame having floor-engaging carrying wheels one of which is a caster wheel, a casing pivoted to said frame and having a collecting nozzle formed with a downwardly facing inlet mouth which overhangs close to the floor, and a handle pivoted to said frame and projecting over said caster wheel, said casing and frame each comprising an independent rigid structure.

10. In a suction cleaner, in combination, a metal frame or chassis having at least three floor-engaging carrying wheels pivoted thereto in supporting relation, an operating handle pivoted to said frame upon a transverse horizontal axis, and a cleaner casing pivoted to said frame and having a fan chamber and a collecting nozzle, the latter overhanging the forward end of said frame and formed with a horizontal inlet mouth located closely above the floor.

11. In a suction cleaner, in combination, a frame or chassis having at least three floor-engaging carrying wheels pivoted thereto in supporting relation, a fan casing located above said frame or chassis, and having a collecting nozzle which overhangs one end thereof and is formed with a horizontal inlet mouth at its end, and a pair of spaced supports for said casing located at different distances from said inlet mouth, one of said supports comprising a hinge connection between said casing and chassis with its axis horizontal and parallel to the inlet mouth, and the center of gravity of said casing being located between said supports.

12. In a suction cleaner, in combination, a frame having at least three wheels arranged to support the same in stable equilibrium upon a horizontal surface, one of such wheels being a caster and pivoted for movement about a vertical axis, a cleaner-casing supported by said frame and having a collecting nozzle which overhangs the forward part of the frame, and means for raising and lowering said nozzle relatively to said frame.

13. In a suction cleaner, a substantially triangular frame having a wheel at each corner, one of said wheels being a caster and pivoted to said frame upon a vertical axis, a cleaner casing carried by said frame and having a collecting nozzle which overhangs the forward part of the frame which is opposite said caster, an operating handle for said cleaner which projects in the opposite direction from said nozzle, and means for adjusting the height of said nozzle relatively to the plane on which said wheels rest.

14. In a suction cleaner, in combination, a rigid frame, carrying wheels journaled thereto, a cleaner casing pivotally mounted upon said frame on a substantially horizontal axis, said casing having a fan chamber and motor rigidly connected together and also a nozzle which projects beyond the frame and is provided with a downwardly facing inlet mouth, and means for moving said casing about its pivot whereby the distance of said inlet mouth from the floor is varied.

15. In a suction cleaner, the combination with a casing comprising a motor-chamber, fan-chamber, and collecting-nozzle, arranged in the order named and constituting a rigid structure, of a rigid frame approximately triangular in shape secured beneath said casing with one corner of the same substantially beneath the end of said motor casing and the other corners located near said nozzle, carrying wheels pivoted to the last two corners upon a horizontal transverse axis, and a caster journaled in the first corner upon a vertical axis.

In testimony whereof I hereunto affix my signature.

WILLIAM V. ORR.